(12) United States Patent
Kuiper et al.

(10) Patent No.: US 12,055,195 B2
(45) Date of Patent: Aug. 6, 2024

(54) CONVEYOR BELT FASTENER

(71) Applicant: Flexible Steel Lacing Company, Downers Grove, IL (US)

(72) Inventors: Daniel J. Kuiper, Alto, MI (US); Brett E. DeVries, Comstock Park, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 18/102,580

(22) Filed: Jan. 27, 2023

(65) Prior Publication Data

US 2023/0243401 A1  Aug. 3, 2023

Related U.S. Application Data

(60) Provisional application No. 63/304,315, filed on Jan. 28, 2022.

(51) Int. Cl.
*F16G 3/09* (2006.01)

(52) U.S. Cl.
CPC ..................... *F16G 3/09* (2013.01)

(58) Field of Classification Search
None
See application file for complete search history.

(56) References Cited

U.S. PATENT DOCUMENTS

| | | |
|---|---|---|
| 1,420,962 A | 6/1922 | Breuer |
| 1,442,922 A | 1/1923 | Bradshaw |

(Continued)

FOREIGN PATENT DOCUMENTS

| | | |
|---|---|---|
| AU | 125500 | 12/1995 |
| CN | 2199365 | 5/1995 |

(Continued)

OTHER PUBLICATIONS

Notification of Transmittal of the International Search Report and the Written Opinion of the International Searching Authority, or the Declaration from the International Bureau of WIPO for related International Application No. PCT/US23/11774, dated Apr. 14, 2023; 17 pages.

(Continued)

*Primary Examiner* — William R Harp
(74) *Attorney, Agent, or Firm* — Fitch, Even & Tabin & Flannery LLP

(57) ABSTRACT

A conveyor belt fastener having a body with upper and lower plate portions and loop portions connecting the upper and lower plate portions. The upper and lower plate portions have apertures to receive an attachment member for securing the plate portions to an end of a conveyor belt. The body has a lateral spacing between the flared loop portions configured to receive a loop portion of a fastener secured to another end of the conveyor belt. Each loop portions includes proximal portions adjacent the upper and lower plate portions with proximal lateral widths. Each loop portion further includes a laterally enlarged distal portion extending arcuately intermediate the proximal portions along the loop portion for contacting the hinge pin. The laterally enlarged distal portion has a distal lateral width larger than the proximal lateral width to provide a wide contact area between the loop portion and the hinge pin.

31 Claims, 11 Drawing Sheets

(56) References Cited

U.S. PATENT DOCUMENTS

| | | | |
|---|---|---|---|
| 1,612,024 A | 12/1926 | Jacobs | |
| 1,620,603 A | 3/1927 | Munson | |
| 1,735,686 A | 11/1929 | Kimmich | |
| 1,895,345 A | 1/1933 | Pink | |
| 2,265,604 A | 12/1941 | Knoedler | |
| 2,358,534 A | 9/1944 | Perry | |
| 2,441,460 A | 5/1948 | Walters | |
| 2,449,950 A | 9/1948 | Nassimbene | |
| 2,477,855 A | 8/1949 | Beach | |
| 2,566,262 A | 8/1951 | Traxler | |
| 2,935,774 A * | 5/1960 | Schick | F16G 3/02 24/33 B |
| 2,955,065 A | 10/1960 | Victor | |
| 3,084,408 A | 4/1963 | Ireland | |
| 3,105,390 A | 10/1963 | Funke | |
| 3,212,147 A | 10/1965 | Lambert | |
| 3,234,611 A | 2/1966 | Paasche | |
| 3,245,276 A | 4/1966 | Wall | |
| 3,327,358 A | 6/1967 | Schick | |
| 3,327,359 A | 6/1967 | Wiese | |
| 3,368,417 A | 2/1968 | Jenkins | |
| 3,481,807 A | 12/1969 | Kanamori | |
| 3,487,871 A | 1/1970 | Kanamori | |
| 3,546,054 A | 12/1970 | Ross | |
| 3,562,892 A | 2/1971 | Laneri | |
| 3,693,218 A | 9/1972 | Jaubert | |
| 3,719,969 A | 3/1973 | McGinnis | |
| 3,724,645 A | 4/1973 | Spaar | |
| 3,748,698 A | 7/1973 | Lachmann | |
| 3,839,766 A | 10/1974 | Kenney | |
| 3,853,526 A | 12/1974 | Hochart | |
| 3,936,338 A | 2/1976 | Gibson | |
| 3,945,263 A | 3/1976 | Simonsen | |
| 3,962,754 A | 6/1976 | Stolz | |
| 4,023,239 A | 5/1977 | Stolz | |
| 4,030,595 A | 6/1977 | McCombie | |
| 4,031,767 A | 6/1977 | Guyer | |
| 4,032,384 A | 6/1977 | Rauscher | |
| 4,034,617 A | 7/1977 | Guyer | |
| 4,050,138 A | 9/1977 | Stolz | |
| 4,060,877 A | 12/1977 | Schick | |
| 4,099,608 A | 7/1978 | McCombie | |
| 4,212,094 A | 7/1980 | Pray | |
| 4,235,120 A | 11/1980 | Candle | |
| 4,315,349 A | 2/1982 | Stolz | |
| 4,333,217 A | 6/1982 | Pray | |
| 4,411,724 A | 10/1983 | Ito | |
| 4,489,828 A | 12/1984 | Stipdonk | |
| 4,538,755 A | 9/1985 | Schick | |
| 4,548,663 A | 10/1985 | Worcester | |
| 4,564,542 A | 1/1986 | Worcester | |
| 4,582,505 A | 4/1986 | Stolz | |
| 4,618,387 A | 10/1986 | Fisher | |
| 4,620,657 A | 11/1986 | Gladding | |
| 4,648,856 A | 3/1987 | Matsunaga | |
| 4,653,156 A | 3/1987 | Stolz | |
| 4,671,403 A | 6/1987 | Schick | |
| 4,671,834 A | 6/1987 | Price | |
| 4,681,646 A | 7/1987 | Pinto | |
| 4,688,711 A | 8/1987 | Gladding | |
| 4,703,845 A | 11/1987 | Veenhof | |
| 4,715,106 A | 12/1987 | Peterson | |
| 4,734,959 A | 4/1988 | Jaubert | |
| 4,741,235 A | 5/1988 | Price | |
| 4,752,989 A | 6/1988 | Jaubert | |
| 4,757,576 A | 7/1988 | Jaubert | |
| 4,767,244 A | 8/1988 | Peterson | |
| 4,858,280 A | 8/1989 | Schick | |
| 4,911,683 A | 3/1990 | Legge | |
| 4,937,921 A | 7/1990 | Musil | |
| 4,942,645 A | 7/1990 | Musil | |
| 4,996,750 A | 3/1991 | Musil | |
| 5,025,968 A | 6/1991 | Nasiatka | |
| 5,083,985 A | 1/1992 | Alles | |
| 5,095,590 A | 3/1992 | Schick | |
| 5,170,924 A | 12/1992 | Musil | |
| 5,182,933 A | 2/1993 | Schick | |
| 5,186,312 A | 2/1993 | Ambs | |
| 5,236,079 A | 8/1993 | Herold | |
| 5,341,545 A | 8/1994 | Herold | |
| 5,346,439 A | 9/1994 | Lynch | |
| 5,348,143 A | 9/1994 | Musil | |
| 5,368,214 A | 11/1994 | Schick | |
| 5,377,818 A | 1/1995 | White | |
| 5,415,913 A | 5/1995 | Clevenger, Jr. | |
| 5,467,867 A | 11/1995 | Musil | |
| 5,539,959 A | 7/1996 | Schick | |
| 5,542,527 A | 8/1996 | Jakob | |
| 5,544,801 A | 8/1996 | Schick | |
| 5,553,359 A | 9/1996 | Herold | |
| 5,573,470 A | 11/1996 | Jakob | |
| 5,632,701 A | 5/1997 | Neel | |
| 5,644,836 A | 7/1997 | Schick | |
| 5,645,159 A | 7/1997 | Luginbuehl | |
| 5,669,114 A | 9/1997 | Jakob | |
| 5,724,706 A | 3/1998 | Jakob | |
| 5,839,571 A | 11/1998 | Jakob | |
| 5,881,863 A | 3/1999 | Borner | |
| 5,884,369 A | 3/1999 | Schick | |
| 5,890,266 A | 4/1999 | Herold | |
| 6,053,308 A | 4/2000 | Vogrig | |
| 6,085,897 A | 7/2000 | Schick | |
| 6,102,196 A | 8/2000 | Domit, Jr. | |
| 6,196,378 B1 | 3/2001 | Gerhard | |
| 6,216,851 B1 | 4/2001 | Mitas | |
| 6,311,393 B1 | 11/2001 | Garner | |
| 6,353,976 B1 | 3/2002 | Sutherland | |
| 6,488,144 B2 | 12/2002 | Winkelman | |
| 6,516,943 B2 | 2/2003 | Engle | |
| 6,554,934 B1 | 4/2003 | Steven | |
| 6,601,698 B2 | 8/2003 | Jakob | |
| 6,689,247 B1 | 2/2004 | Steven | |
| 6,695,133 B2 | 2/2004 | Steven | |
| 6,739,038 B2 | 5/2004 | Herold | |
| 6,749,708 B2 | 6/2004 | Allen | |
| 6,808,580 B2 | 10/2004 | Allen | |
| 6,848,571 B2 | 2/2005 | Allen | |
| D513,964 S | 1/2006 | Overthun | |
| D539,291 S | 3/2007 | Li | |
| 7,261,929 B2 | 8/2007 | Allen | |
| D572,119 S | 7/2008 | Wells | |
| 7,703,600 B1 | 4/2010 | Price | |
| 7,721,877 B2 | 5/2010 | Maine, Jr. | |
| 8,066,116 B2 | 11/2011 | Herold | |
| 8,151,432 B2 | 4/2012 | Daniels | |
| 8,365,906 B2 | 2/2013 | Moeschen-Siekmann | |
| 8,403,139 B2 | 3/2013 | Richardson | |
| 8,453,320 B2 | 6/2013 | Van Swearingen | |
| 8,684,170 B2 | 4/2014 | Jakob | |
| 8,701,876 B2 | 4/2014 | Jakob | |
| 8,770,394 B2 | 7/2014 | Huels | |
| 8,910,462 B2 | 12/2014 | De Smet | |
| 9,033,137 B2 | 5/2015 | Koppes | |
| 9,157,502 B2 | 10/2015 | Hagie | |
| 9,200,696 B2 | 12/2015 | Jakob | |
| 9,428,340 B2 | 8/2016 | Gilg | |
| 9,466,896 B2 | 10/2016 | Harmason | |
| 9,506,526 B2 | 11/2016 | Moeschen-Siekmann | |
| 9,511,400 B2 | 12/2016 | Charre | |
| 9,556,930 B2 | 1/2017 | Daniels | |
| 9,829,067 B2 | 11/2017 | Daniels | |
| D808,253 S | 1/2018 | Daniels | |
| 10,107,359 B2 | 10/2018 | Daniels | |
| 10,385,943 B2 | 8/2019 | Daniels | |
| D882,382 S | 4/2020 | Daniels | |
| 10,711,864 B2 | 7/2020 | Huels | |
| 10,746,256 B2 | 8/2020 | Huels | |
| 11,022,197 B2 | 6/2021 | Dailey | |
| 11,713,796 B2 | 8/2023 | Dailey | |

FOREIGN PATENT DOCUMENTS

| | | |
|---|---|---|
| CN | 2596103 | 12/2003 |
| CN | 101270795 | 9/2008 |

(56) References Cited

FOREIGN PATENT DOCUMENTS

| | | |
|---|---|---|
| CN | 201133441 | 10/2008 |
| CN | 201258946 Y | 6/2009 |
| CN | 201434047 | 3/2010 |
| CN | 102116361 | 7/2011 |
| CN | 102575747 A | 7/2012 |
| CN | 205118121 U | 3/2016 |
| CN | 205423686 | 8/2016 |
| CN | 206092811 | 4/2017 |
| DE | 1034934 | 7/1958 |
| DE | 1101062 B | 3/1961 |
| DE | 2155747 | 5/1973 |
| DE | 2234916 | 1/1974 |
| DE | 2357994 | 6/1974 |
| DE | 2320410 | 10/1974 |
| DE | 3310224 | 10/1983 |
| DE | 3227729 | 1/1984 |
| DE | 3941675 | 6/1991 |
| DE | 4012877 | 10/1991 |
| DE | 4431835 | 2/1996 |
| DE | 19856271 | 6/2000 |
| EP | 0073933 | 3/1983 |
| EP | 3115642 A1 | 1/2017 |
| FR | 571613 | 5/1924 |
| FR | 2294954 | 7/1976 |
| GB | 1603544 | 11/1981 |
| GB | 2146730 | 4/1985 |
| GB | 2202605 | 9/1988 |
| JP | 4346119 | 5/1999 |
| JP | H11130220 | 5/1999 |
| JP | 11173384 | 6/1999 |
| JP | 2000018335 | 1/2000 |
| JP | 2000119930 | 4/2000 |
| JP | 3428498 | 12/2000 |
| JP | 2000344319 | 12/2000 |
| JP | 2001021006 | 1/2001 |
| JP | 2001355681 | 12/2001 |
| JP | 2005343685 | 12/2005 |
| RO | 115612 | 4/2000 |
| RO | 115613 | 4/2000 |
| SU | 499186 | 1/1976 |
| SU | 652393 | 3/1979 |
| SU | 655608 | 4/1979 |
| SU | 783035 | 11/1980 |
| SU | 783521 | 11/1980 |
| SU | 1551881 | 3/1990 |
| SU | 1694442 | 11/1991 |
| WO | 2012038155 | 3/2012 |
| WO | 2012072274 | 6/2012 |
| WO | 2012103961 | 8/2012 |
| WO | 2016028586 | 2/2016 |
| WO | 2016096433 A1 | 6/2016 |
| WO | 2017005384 A1 | 1/2017 |
| WO | 2023147079 | 8/2023 |
| ZA | 200002997 | 3/2001 |

OTHER PUBLICATIONS

Goro, Titan brochure, publicly available more than one year before Aug. 18, 2014, 6 pages.
Goro, Titan Conveyor Belt Fastening System, 1980, 5 pages.
ML T Fasteners, publicly available more than one year before Aug. 18, 2014, 4 pages.
Mato, Hammer System MH30, publicly available more than one year before Aug. 18, 2014, 6 pages.
Scandura Mato, Belt Fasteners and Ancillary Conveyor Equipment brochure, publicly available more than one year before Aug. 18, 2014, 4 pages.
Mato, Standard System S30 brochure, publicly available more than one year before Aug. 18, 2014, 4 pages.
Mato Mining Service, Mato Hingeless Belt Fastening System, publicly available more than one year before Aug. 18, 2014, 4 pages.
Clipper-Mato Belt Fastening Systems for Mining Operations, publicly available more than one year before Aug. 18, 2014, 6 pages.
Mato, Belt Lacing-Systems brochure, publicly available more than one year before Aug. 18, 2014, 20 pages.
Website, Goro, Titan Staggered and Titan 05, publicly available more than one year before Aug. 18, 2014, 2 pages.
Goro, Titan H brochure, publicly available more than one year before Aug. 18, 2014, 12 pages.
Website, Goro, Record V6 and Operating procedure, publicly available more than one year before Aug. 18, 2014, 3 pages.
Charter Wire, Charter Wire brochure, publicly available more than one year before Aug. 18, 2014, 5 pages.
Charter Wire, Near Net Shapes brochure, publicly available more than one year before Aug. 18, 2014, 8 pages.
Moeschen, Steel Cable Conveyor Belt Having a Connection Hinge for Coupling Two Belt Ends, Mar. 29, 2012, WIPO (Year: 2012).
YouTube Video entitled "How to make your own replacement gym Cables—DIY Gym Cables" https://www.youtube.com/watch?v=nn289DvKjP8; published Mar. 30, 2017 Disclosing Screen Captures and Audio Transcription.

* cited by examiner

# CONVEYOR BELT FASTENER

CROSS-REFERENCE TO RELATED APPLICATION

This application claims the benefit of U.S. Provisional Patent App. No. 63/304,315, filed Jan. 28, 2022, which is hereby incorporated by reference in its entirety.

FIELD

This disclosure relates to conveyor belt fasteners and, more specifically, to conveyor belt fasteners having upper and lower plates and loops connecting the plates.

BACKGROUND

Hinge-style belt splices are used to connect ends of a conveyor belt or belts, such as for installing the conveyor belt or repairing a damaged section of the conveyor belt. One type of hinge-style belt splice includes conveyor belt fasteners having fastener bodies with upper and lower plates that are positioned on upper and lower surfaces of a conveyor belt end and arcuate loops connecting the upper and lower plates of the fastener body.

During installation, fasteners are applied to both conveyor belt ends by driving attachment members such as rivets or staples through apertures of the upper plates, through the conveyor belt ends, and through apertures of the lower plates of the fasteners. Once the fasteners have been applied to the conveyor belt ends, the conveyor belt ends are positioned near one another such that the loops of the fasteners are interlaced and form an opening defined by the interlaced loops. A hinge pin of the hinge-style belt splice is then advanced through the opening of the interlaced loops to pivotally connect the conveyor belt ends. The interlaced loops extend around the hinge pin and shift about the hinge pin as the conveyor belt travels along the conveyor belt system, such as around head and tail pulleys of the conveyor system.

The conveyor belt is under tension and imparts high loads on the splice, especially in heavy-duty environments such as mining that utilize high belt speeds and convey heavy material. Some prior hinge-style belt splices have loops that each have a constant cross-section throughout the entire the loop. The constant cross-section of the loops enables the greatest flexibility in assembling the interlaced loops but can limit the strength of the fastener due to contact stresses on the hinge pin, which damage the pin over the life of the splice. The constant cross-section of the loops of these prior fasteners also can limit the strength of the loops.

These prior fasteners typically have a fastener body that is stamped or otherwise formed from a base material to form a blank having plates and spaced, straight members connecting the plates. The straight members are then bent to form the loop portions of the fastener body. One known method to increase the strength of fastener loops is to thicken the base material used to construct the fastener body, but thickening the base material increases cost and tends to create issues in other areas of the splice. For example, features such as sharp bends and coining operations are affected by increased material thickness. Further, the fasteners of a splice should not protrude significantly above the conveyor surface to avoid undesirable wear and potential damage arising from impact against other mechanical components of the conveyor, such as conveyor belt cleaner blades. These considerations can limit the acceptable base material thickness for many types of fasteners.

SUMMARY

In one aspect of the present disclosure, a conveyor belt fastener is provided having a body with upper and lower plate portions and loop portions connecting the upper and lower plate portions. The upper and lower plate portions have apertures to receive an attachment member for securing the plate portions to an end of a conveyor belt. The body has a lateral spacing between the flared loop portions configured to receive a loop portion of a fastener secured to another end of the conveyor belt. Each loop portion includes proximal portions adjacent the upper and lower plate portions, with each proximal portion having a proximal lateral width. Each loop portion further includes a laterally enlarged distal portion extending arcuately intermediate the proximal portions along the loop portion for contacting the hinge pin. The laterally enlarged distal portion has a distal lateral width larger than the proximal lateral width to provide a wide contact area between the loop portion and the hinge pin. The wide contact area between the loop portions of the fastener and the hinge pin spreads forces in the loop portions over a larger area of the loop portions and decreases peak stresses in the loop portions which improves the durability of the fastener.

The present disclosure also provides a conveyor belt fastener including an upper plate portion, a lower plate portion, and loop portions connecting the upper and lower plate portions. The upper and lower plate portions have apertures to receive an attachment member to attach the upper and lower plate portions to an end of a conveyor belt. The loop portions have a spacing configured to receive a loop portion of another conveyor belt fastener. The spacing varies in width between the loop portions as the loop portions extend between the upper and lower plate portions. The loop portions include distal portions having a narrowest portion of the spacing therebetween. The loop portions further include proximal portions adjacent the upper and lower plate portions. The proximal portions have a wider portion of the spacing therebetween that is wider than the narrowest portion between the distal portions of the loop portions. The proximal portions of the loop portions provide clearance for a distal portion of the loop portion of the other conveyor belt fastener to be received between the proximal portions of the loop portions. In this manner, the wider distal portions of the loop portions provide an enlarged contact area with a hinge pin while the proximal portions of the loop portions provide clearance for a similarly wide distal portion of the loop portion of the other conveyor belt fastener.

In another aspect of the present disclosure, a method is provided for manufacturing a body of a conveyor belt fastener. The method includes forming an elongate, flat fastener body from a base material. The forming operation may utilize, for example, laser cutting or stamping the flat fastener body from the base material. The flat fastener body includes plate portions and a pair of flat, flared loop portions having a lateral spacing therebetween for receiving a loop portion of another conveyor belt fastener. The flat, flared loop portions each have a proximal portion adjacent the plate portions and a laterally enlarged distal portion intermediate the proximal portions along the flat, flared loop portions. The proximal portions each have a proximal lateral width and the laterally enlarged distal portions each have a distal lateral width larger than the proximal lateral width.

The method further includes bending the flat, flared loop portions of the flat fastener body into an arcuate configuration to orient one of the plate portions above the other of the plate portions. Bending the flat, flared loop portions into the arcuate configuration shapes the loop portions to be interdigitated with loop portions of another fastener and receive a hinge pin through the interdigitated loop portions. The method may include various other operations, such as coining of outboard ends of the plate portions, forming apertures in the plate portions, and/or assembling one or more attachment members with the fastener body.

DETAILED DESCRIPTION

Figure 1:
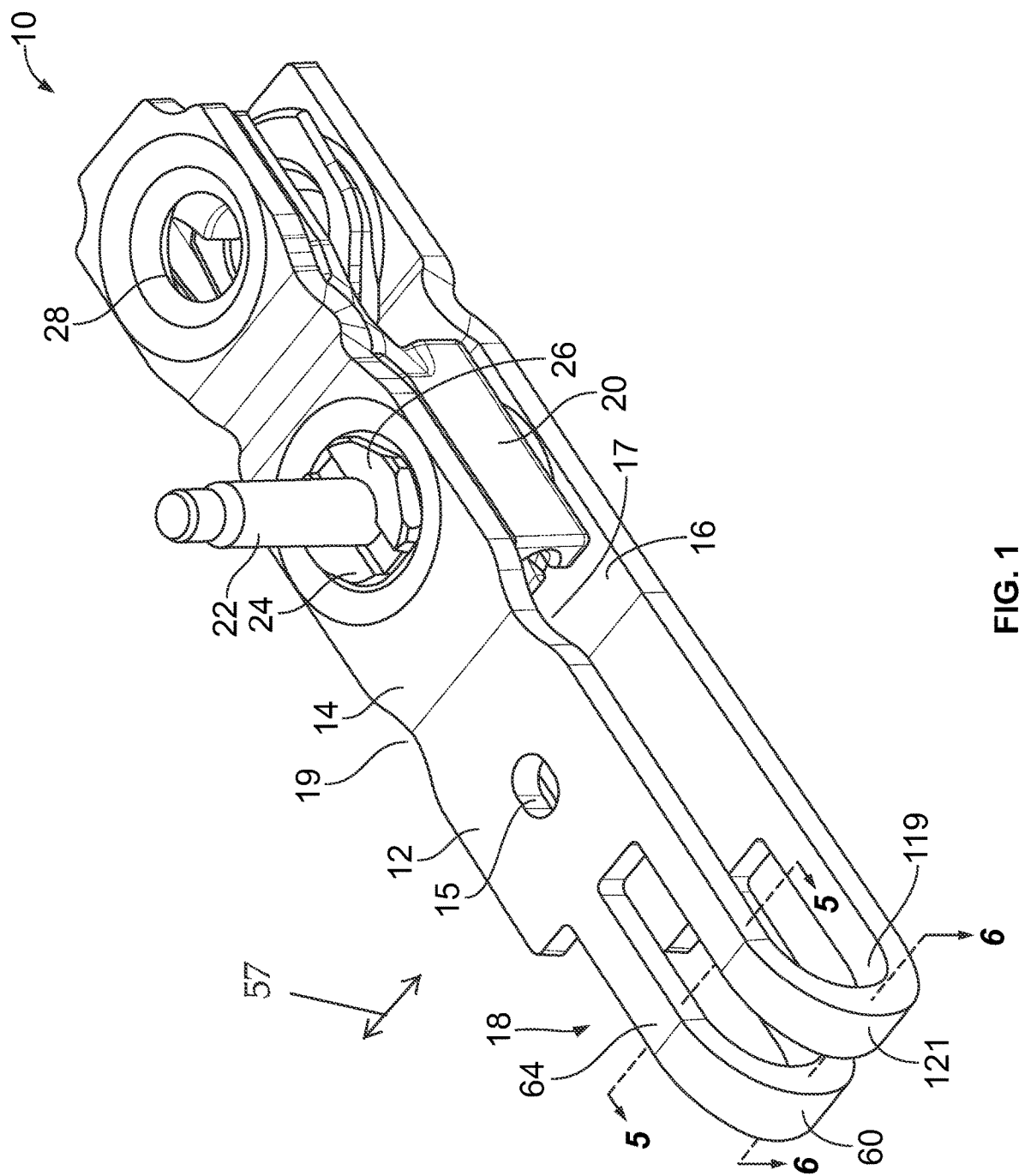
FIG. 1 is a perspective view of a fastener having a fastener body with an upper plate portion, a lower plate portion, and flared loop portions connecting the upper and lower plate portions.

Referring to FIG. 1, a fastener 10 is shown having a fastener body 12 with an upper plate portion 14, a lower plate portion 16, and one or more arcuate loop portions 18 connecting the upper and lower plate portions 14, 16. The fastener body 12 has a unitary construction and may be made of a metallic material such as steel. The fastener body 12 transfers loads between a conveyor belt end secured between upper and lower plate portions 14, 16 and a hinge pin 30 (see FIG. 2) received in an opening formed by the loop portions 18, as described further hereinafter.

The loop portions 18 are flared such as by having flared distal portions 60 that are wider in a lateral direction 57 than proximal portions 64. The flared distal portions 60 widen the loop portions 18 laterally which is the direction that the hinge pin 30 extends. As such, the flared loop portions 18 have a greater contact area with the hinge pin 30 over loop portions 18 that are not flared. This allows the flared loop portions 18 to spread the contact forces with the hinge pin 30 during conveyor belt operation over a greater surface area. In some embodiments, it has been found that the flared loop portions 18 reduce peak stress in the loop portions 18 by thirty percent compared to loops of some prior fasteners that have a uniform width or lateral dimension. By lowering peak stress and distributing forces over a greater area, the durability of the loop portions 18 may be improved compared to loops having uniform cross-sections throughout as in conventional fasteners.

As discussed above, the flared distal portions 60 reduces the contact stresses on the hinge pin 30 by spreading the applied tension force or load over a larger area. This has a meaningful impact on the life of the hinge pin 30. One common hinge pin 30 has a braided steel cable construction. With use, the small wires that make up the braided cable may wear and/or fracture due to contact forces applied by the non-flared loops of conventional fasteners. Steel has a well-known non-linear relationship between applied stress and fatigue life, so reducing the contact stress by only a small percentage suggest a possible large increase in useful life of hinge pins 30 made of braided steel cable.

In one embodiment, the fastener 10 is configured to be secured to a conveyor belt end having steel cables embedded therein. The fastener 10 may include crimps that are secured to the steel cables and abut a stop block 20 of the fastener 10. The fastener 10 may further include a bolt 22 and a nut 24 that extend through apertures or openings 26 of the upper and lower plate portions 14, 16 to secure the upper and lower plate portions 14, 16 to the conveyor belt end. The bolt 22 has an end portion that extends proud of the upper plate portion 14 and is removed after installation of the fastener 10 on a conveyor belt end. The body 12 may also include openings 28 in the upper and lower plate portions 14, 16 that receive another bolt and nut assembly to further secure the upper and lower plate portions 14, 16 to the conveyor belt end. The fastener is similar in many respects to the fasteners discussed in U.S. Pat. No. 11,022,197, which issued on Jun. 1, 2021, the entirety of which is hereby incorporated by reference herein.

Installing a splice between a pair of conveyor belt ends using fasteners 10 includes trimming rubber from cables of the conveyor belt ends, mechanically securing the fasteners to cables of the conveyor belt ends, interdigitating the loop portions 50, 52 of the fasteners 10, and advancing a hinge pin through the interdigitated loop portions 50, 52. The installation further includes pouring a quick-cure polymer onto the fasteners 10 and exposed sections of the cable to embed the splice. The quick-cure polymer embeds the fasteners 10, cables, and hinge pin to protect the splice and keep the components of the splice securely assembled while being sufficiently flexibly resilient to allow the so-formed splice to allow the fasteners 10 to pivot about the hinge pin during conveyor belt operation, particularly as the belt travels about the head and tail pulleys of the conveyor belt system.

Regarding FIG. 1, the upper plate portion 14 has an opening 15 that permits quick cure polyurethane poured onto the upper plate portion 14 to flow into the opening 15 and into the space between the upper and lower plate portions 14, 16. When the polyurethane hardens, there is a column of polyurethane extending in the opening 15 and connecting the polyurethane above and below the upper plate portion 14. The engagement between the column of the polyurethane and the side surfaces of the opening 15 forms a mechanical attachment point between the polyurethane and the fastener 10. Similarly, the upper plate portion 14 has side recesses or notches 17, 19 that cooperate to form openings with corresponding notches of adjacent fasteners when the fasteners 10 are installed side-by-side on a conveyor belt end. The quick cure polyurethane flows into the openings of the side-by-side fasteners 10 formed by the cooperating notches 17, 19 and into the spacings between the upper and lower plate portions 14, 16 of the side-by-side fasteners 10. Once the polyurethane hardens, the polyurethane extending in the openings formed by the notches 17, 19 engage the upper plate portions 14 of the side-by-side fasteners which provides additional mechanical attachment points for the polyurethane and the fasteners. When the upper layer of cured polyurethane above the upper plate portions 14 is subjected to a force that tends to pull the polyurethane away from the upper plate portions 14, such as due to a damaged conveyor belt cleaner, the polyurethane columns extending in the openings 15, 17, 19 mechanically resists the upper polyurethane layer from pulling away since the polyurethane columns are attached to the polyurethane below the upper plate portions 14. In this manner, the polyurethane columns extending in the openings 15, 17, 19 operate as anchors to mechanically resist the polyurethane layer on the upper plate portions 14 from pulling away from the upper plate portions 14. The openings 15, 17, 19 and polyurethane extending therein thereby improve the durability of the splice formed using the fastener 10.

Figure 2:
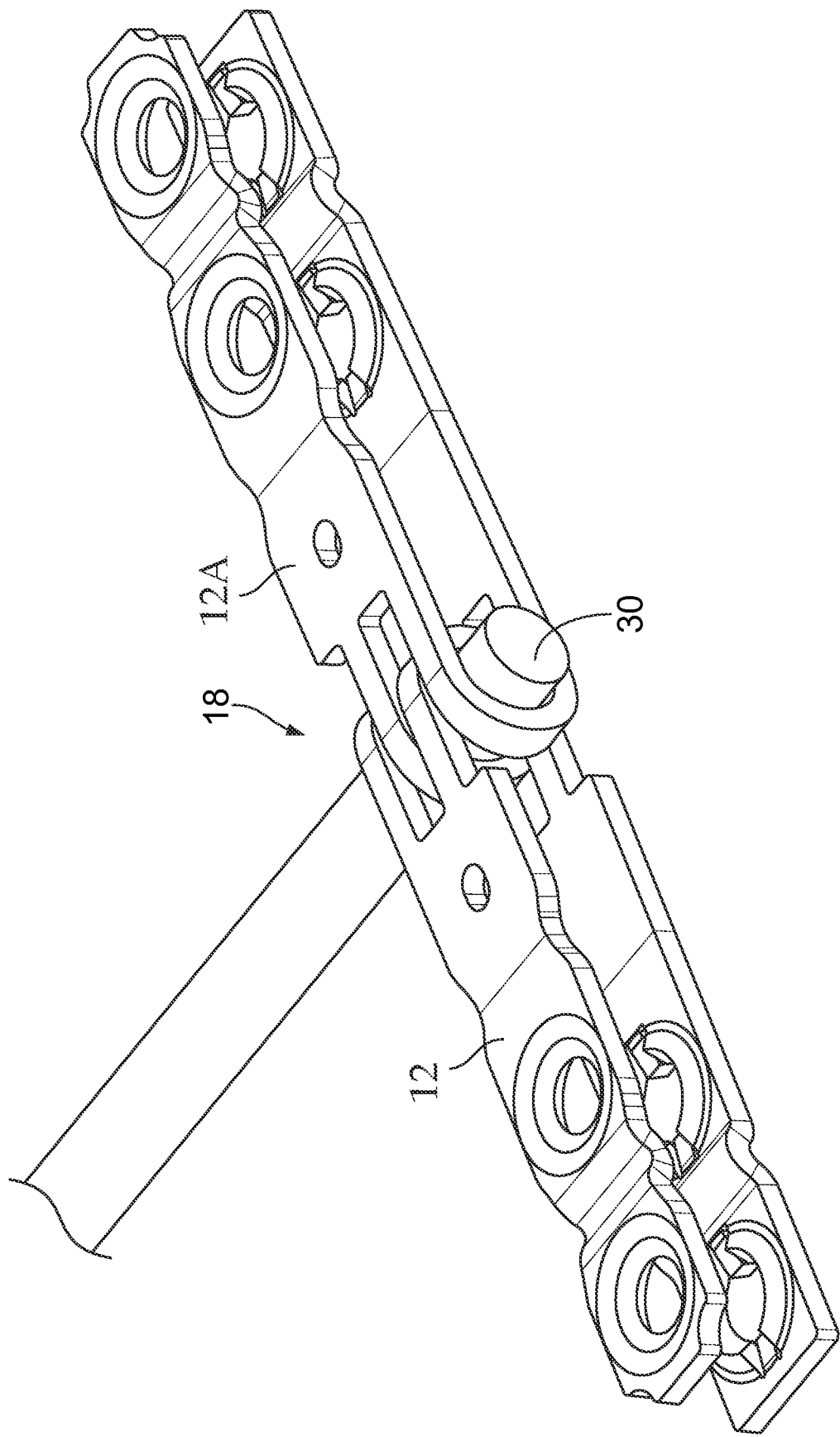
FIG. 2 is a perspective view of the fastener bodies of two fasteners similar to the fastener of FIG. 1 pivotally connected with a hinge pin.

Referring to FIG. 2, two fastener bodies 12, 12A are shown pivotally connected to the hinge pin 30 with the other components associated with the fastener bodies 12, 12A removed for clarity. The flared arcuate loop portions 18 of the fastener bodies 12, 12a secured to opposing conveyor belt ends are interlaced with one another, and the hinge pin 30 is inserted through the opening formed by the interlaced loop portions 18.

Figure 3:
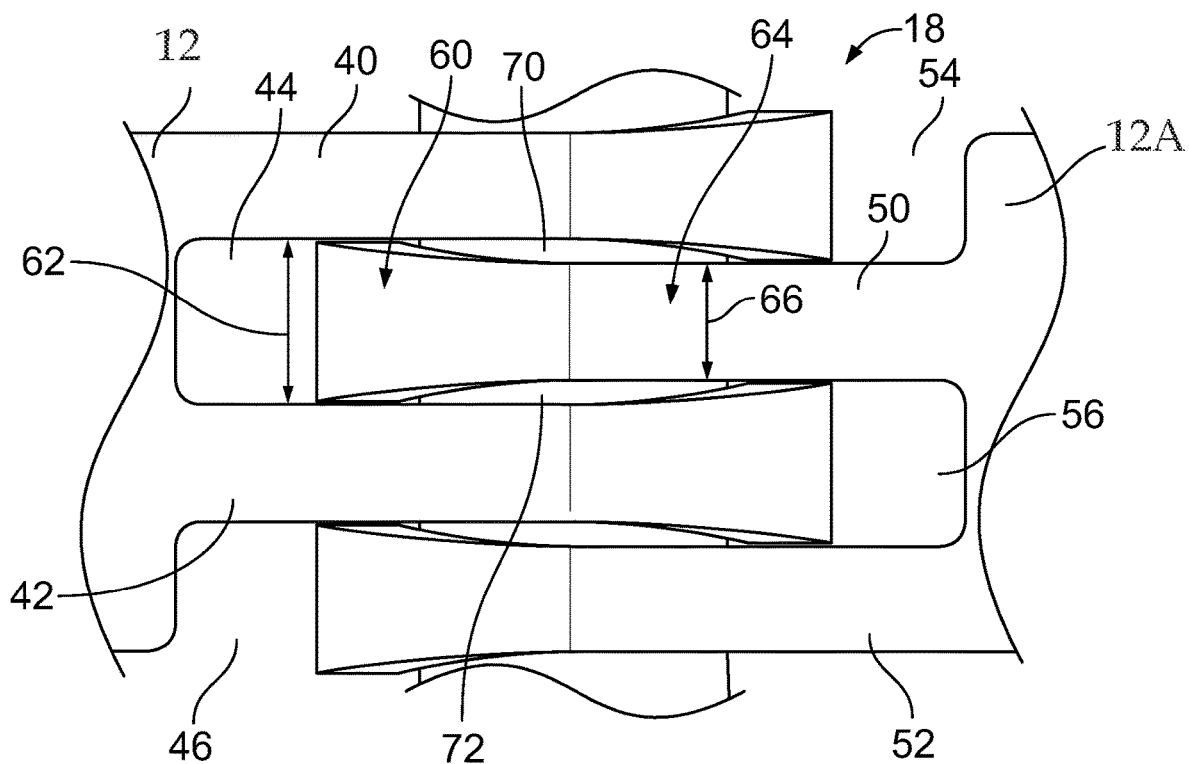
FIG. 3 is a top plan view of interlaced loops of the fastener bodies of FIG. 2 showing the flared loop portions having wider, flared distal portions and narrower, proximal portions to provide clearance for the flared distal portions of the adjacent loop portions.

Referring to FIG. 3, the fastener body 12 includes loop portions 40, 42 and openings 44, 46. The fastener body 12A includes arcuate loop portions 50, 52 and recesses 54, 56. Each of the arcuate loop portions 40, 42, 50, and 52 include the curved and flared distal portion 60 with a maximum lateral width 62 and a straight and narrow proximal or inboard portion 64 with a minimum lateral width 66 that is less than the maximum lateral width 62. The flared distal portion 60 of the loop portion 50 provides increased material to absorb loading from the hinge pin 30 as well as increased surface area to contact the hinge pin 30 which reduces peak stress concentrations in the hinge pin 30. The difference in the lateral widths 62, 66 forms recess portions 70, 72 of the recesses 54, 56 that are enlarged to provide clearance for the flared distal portion 60 of loop portions 18 received in the recess portions 70, 72 as the fastener bodies 12, 12A pivot about the hinge pin 30. The loop portions 18 are contoured at the narrowest and widest points thereof to create sufficient clearance to permit pivotal movement of the fastener bodies 12, 12A secured to opposing belt ends about the hinge pin 30 and allow the splice including the fasteners 10 to travel around the smallest pulley diameter specified for the fasteners 10, hinge pin 30, and conveyor belt.

Figure 4:
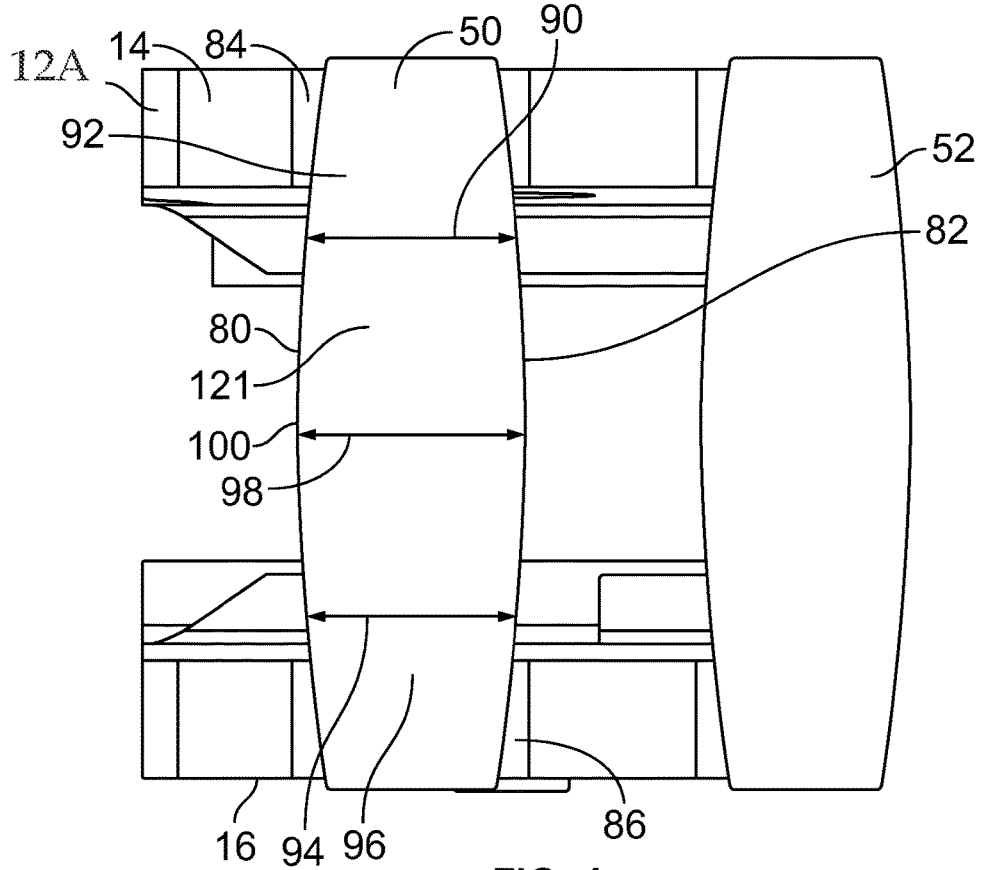
FIG. 4 is front elevational view of the fastener body of the fastener of FIG. 1 showing arcuate sides of the flared loop portions.

With reference to FIG. 4, the loop portion 50 has opposite side surfaces 80, 82 that extend between and to outboard laterally extending surfaces 84, 86 of the upper and lower plate portions 14, 16. The side surfaces 80, 82 of the loop portion 50 taper apart from one another such that the opposite side surfaces 80, 82 have a first width 90 at a portion 92 along or near an upper run of the loop portion 50, a second width 94 therebetween at a lower portion 96 along or near a lower run of the loop portion 50, and a third width 98 therebetween at a midpoint 100 of the arc or curve of the loop portion 50 that is larger than the first and second widths 90, 94, which are the same. In other words, the loop portion 50 gradually widens as the loop portion 50 extends away from one of the upper and lower plate portions 14, 16 until the loop portion 50 reaches its farthest distal point at which it has its greatest width whereupon the loop 50 starts to taper back down and get narrower as the loop portion 50 extends toward the other of the upper and lower plate portions 14, 16.

Figure 5:
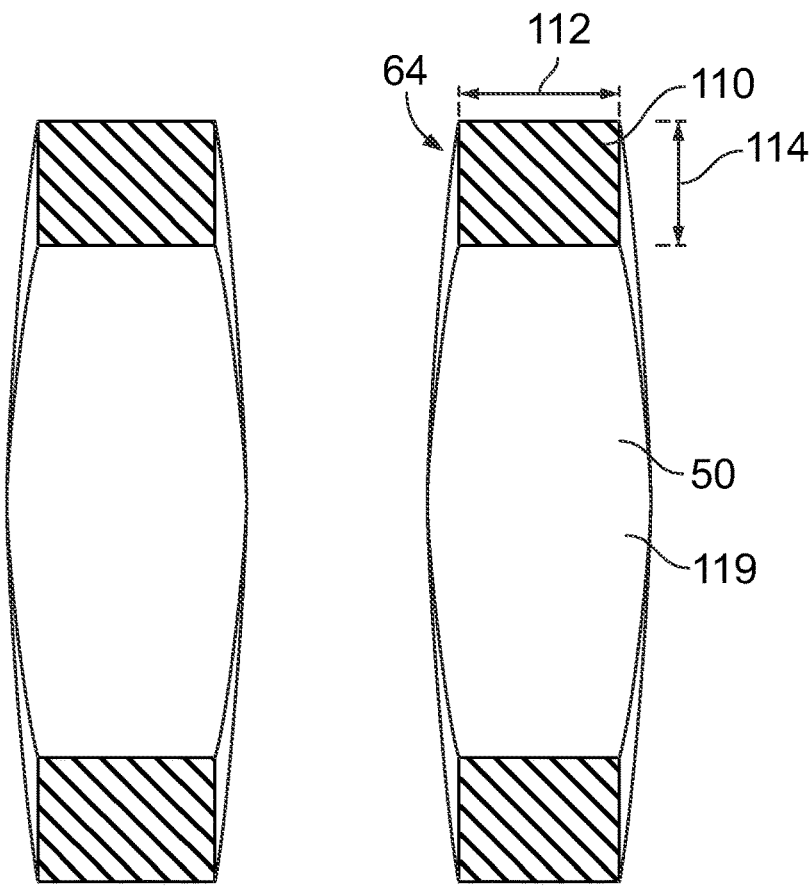
FIG. 5 is a cross-sectional view taken across line 5-5 in FIG. 1 showing cross sections of the proximal portions of the loop portions and inner surfaces of the loops for contacting the pin.

Regarding FIG. 5, the loop portion 50 has a cross-section 110 at the proximal portion 64, the cross-section 110 being parallel to the thickness of the loop portion 50. Stated differently, the cross-section 110 is perpendicular to the inner and outer surfaces 119, 121 of the loop portion 50 at the proximal portion 64. The cross-section 110 has a width 112 and a thickness 114. The thickness 114 extends between inner and outer surfaces 119, 121 of the loop portions 50.

Figure 6:
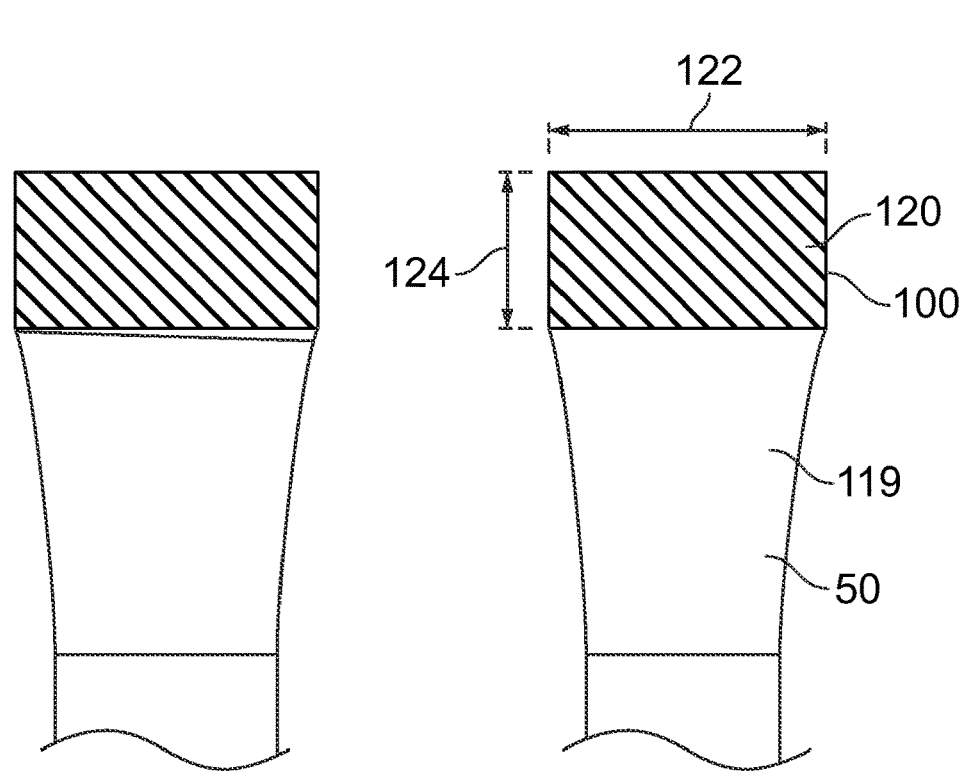
FIG. 6 is a cross-sectional view taken across line 6-6 in FIG. 1 showing cross-sections of the wider flared distal portions of the loop portions that are laterally wider than the cross-sections of the narrower proximal portions of the loop portions.

Regarding FIG. 6, the loop portion 50 has a cross-section 120 parallel to the thickness of the loop portion 50 at the midpoint 100. Stated differently, the cross-section 120 is perpendicular to the inner and outer surfaces 119, 121 at the midpoint 100. The cross-section 120 has a width 122 that is greater than the width 112 of the proximal portion 64 and a thickness 124 that is similar to the thickness 114 of the proximal portion 64. The larger width 122 at the midpoint 100 of the loop portion 50 provides more material in the loop portion 50 to increase the cross-sectional area of the loop portion 50 where the loop portion 50 experiences the highest stress at the interface with the hinge pin 30. The wider, flared distal portions 60 thereby reduce stress in the loop portions 18 and engage the hinge pin 30 over a larger surface area which more evenly distributes loading from the loop portions 18 along the hinge pin 30.

Figure 7:
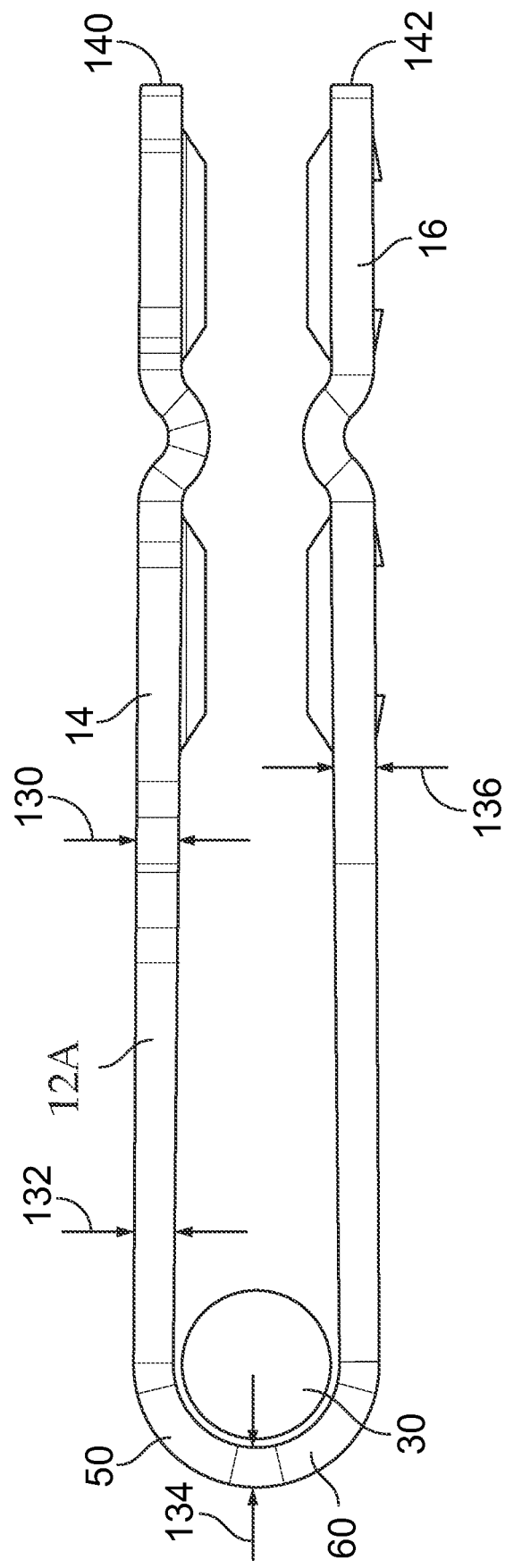
FIG. 7 is a side elevational view of the fastener body of the fastener of FIG. 1 showing a substantially uniform thickness of the fastener body from an inboard end of the upper plate, along the flared loop, and to an inboard end of the lower plate.

Regarding FIGS. 6 and 7, because the flared distal portions 60 of the loop portions 18 have a similar thickness 124 to the thickness 114 of the proximal portion 64, the fastener body 12A (and fastener body 12, which is identical) may have a thickness 130 of the upper plate portion 14 that is substantially the same as: (1) a thickness 132 of the proximal portion 64; (2) a thickness 134 of the flared distal portion 60; and (3) a thickness 136 of the lower plate portion 16. The thickness 132 is equivalent to the thickness 114 in FIG. 5 and the thickness 134 is equivalent to the thickness 124 of the cross section in FIG. 6. The similar thicknesses 130, 132, 134, 136 permit the fastener body 12 to be formed from a base material having a uniform thickness. Further, for a given thickness of the fastener body 12, the loop portions 18 may be stronger than a fastener having non-flared loops due to the wider lateral width 122 at the midpoint 100 of the loop portions 18. In one embodiment, the upper plate portion 14 has an inboard end 140 and the lower plate portion 16 has an inboard end 142. The plate body 12 has substantially the same thickness throughout the fastener body 12 all the way from the inboard end 40 of the upper plate portion 14, along the upper plate portion 14, the loop portion 50, and the lower plate portion 16, and to the inboard end 142. It is intended that the phrase substantially the same thickness is intended to encompass a thickness of the fastener body 12 that is +/−5% of an average thickness of the fastener body 12.

Figure 8:
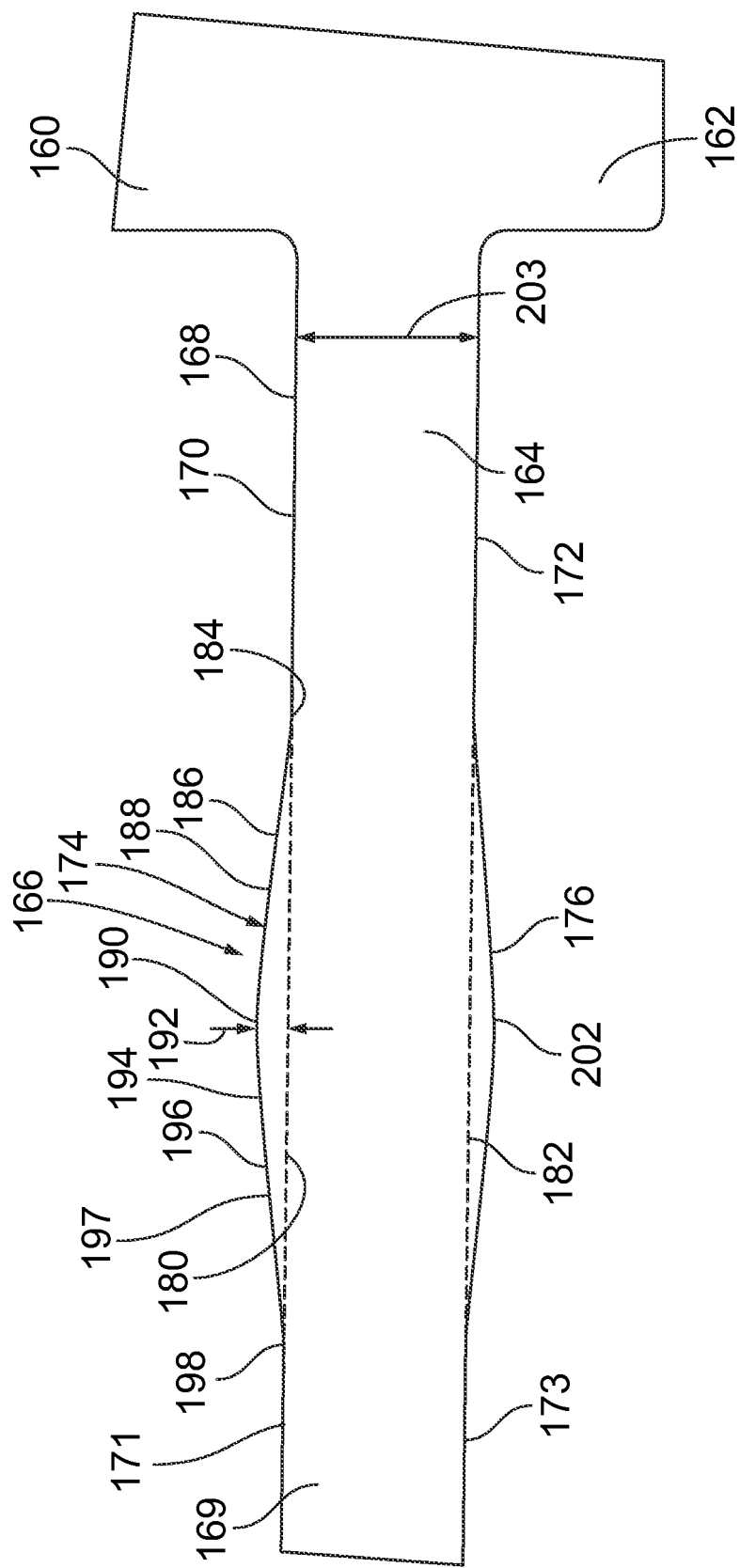
FIG. 8 is a plan view of a flat loop portion of an elongate, flat fastener body prior to the flat loop portion being bent into an arcuate configuration.

The fastener body 12 may initially have a flattened configuration once the fastener body has been formed from the base material to provide the geometry for the loop portions 18 and associated recesses (e.g., recesses 44, 46, 54, 56). As shown in FIG. 8, an initial fastener body 160 has an initial plate portion 162 and an initial loop portion 164. The fastener body 160 is flat and lacks any apertures and the loop portion 164 has not yet been bent into an arcuate shape. The loop portion 164 has an initial flared distal portion 166, an initial proximal portion 168, and an initial proximal portion 169. The proximal portion 168 has side surface portions 170, 172 and the proximal portion 169 has side surface portions 171, 173. In one embodiment, the side surface portions 170, 171, 172, 173 are flat, the side surface portions 170, 172 extend parallel to each other, and the side surface portions 171, 173 extend parallel to each other. The flared distal portion 166 includes curved side surface portions 174, 176. The sides of the loop portion 164 are smooth and lack sharp transitions that could operate as stress risers.

Lines 180, 182 are shown in FIG. 8 extending between the side surface portions 170, 171 and 172, 173 to illustrate the increase in the base material in the flared distal portion 166 over the proximal portions 168, 169 due to the tapered or outwardly bowed profile of the flared distal portion 166. Specifically, the side surface portion 174 of the flared distal portion 166 tapers outwardly from a juncture 184 with the flat side surface portion 170. The side surface portion 174 has a concave section 186, a transition 188, a convex section 194, an outermost peak 190 of the convex section 194, a transition 196, and a concave section 197 that joins side surface portion 171 at juncture 198 with the flat side surface portion 171. The side surface portion 174 changes from concave to convex and back to concave at the transitions 188 and 196. The side surface portion 176 has the same geometry as the side surface portion 174. The concave-convex-concave profile of the side surfaces portions 174, 176 limits stress risers in the fastener body 160.

At the peak 190, the side surface portions 174, 176 extend outward a distance 192 from the lines 180, 182. The distance 190 provides a maximum width of the loop portion 164 at a midpoint 202 of the loop portion 164. The maximum width of the loop portion 164 at the midpoint 202 is equal to twice the distance 192 plus the width 203 of the proximal portions 168, 169. The side surface portions 174, 176 of the loop portion 164 provide the widening profile of the loop portion 164 once the loop portion has been bent (see e.g., FIG. 4).

In another embodiment, the side surface portions 170, 172 and 171, 173 of the proximal portions 168, 169 are curved. For example, the side surface portions 170, 172 and 171, 173 of the proximal portions 168, 169 and the side surface portions 174, 174 of the flared distal portion 166 may be portions of a sinusoidal shape that defines the opposite side surfaces of the loop portion 164.

Figure 9:
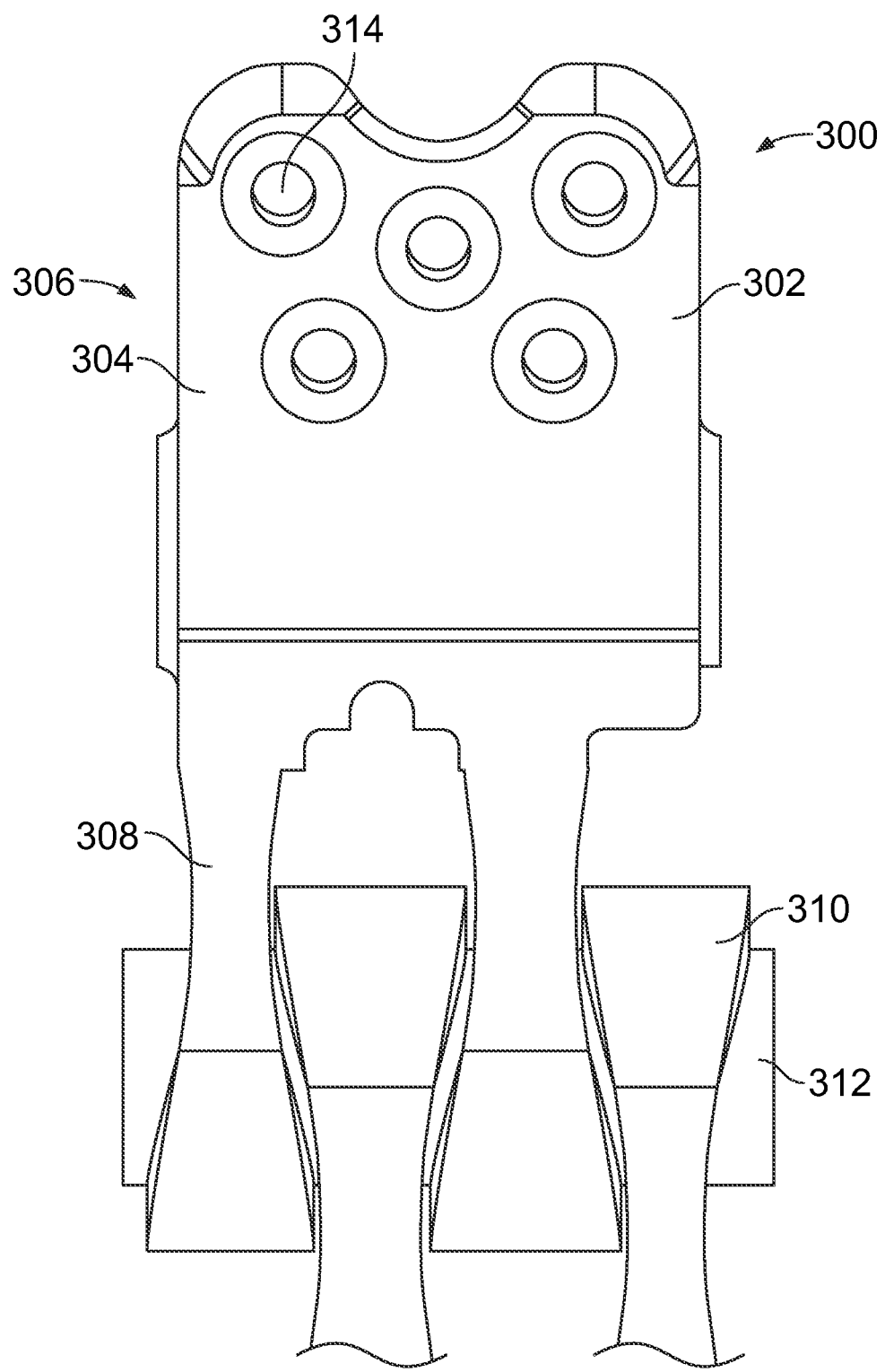
FIG. 9 is a plan view of a rivet fastener having loop portions with flared distal portions.

The flared loop portions described herein may be used in conjunction with various types of fasteners. For example and referring to FIG. 9, a fastener 300 is shown that has a fastener body 302 with an upper plate portion 304, a lower plate portion 306 (behind the upper plate portion 304 in FIG. 9), and arcuate loop portions 308 connecting the upper and lower plate portions 304, 306. The loop portions 308 are shown interlaced with loop portions 310 of another fastener 300 secured to an opposite belt end with a hinge pin 312 extending through the opening formed by the interlaced loop portions 310. The fastener 300 is a rivet fastener that includes openings 314 in the upper and lower plate portions 304, 306 to receive rivets that secure the upper and lower plate portions 304, 306 to a conveyor belt end.

Conveyor belt fasteners in accordance with the present disclosure may utilize various types of attachment members for securing the conveyor belt fasteners to conveyor belt ends. For example, a conveyor belt fastener in accordance with the present disclosure may utilize one or more staples, one or more rivets, one or more screws, and/or one or more bolts and nuts.

Figure 10A:
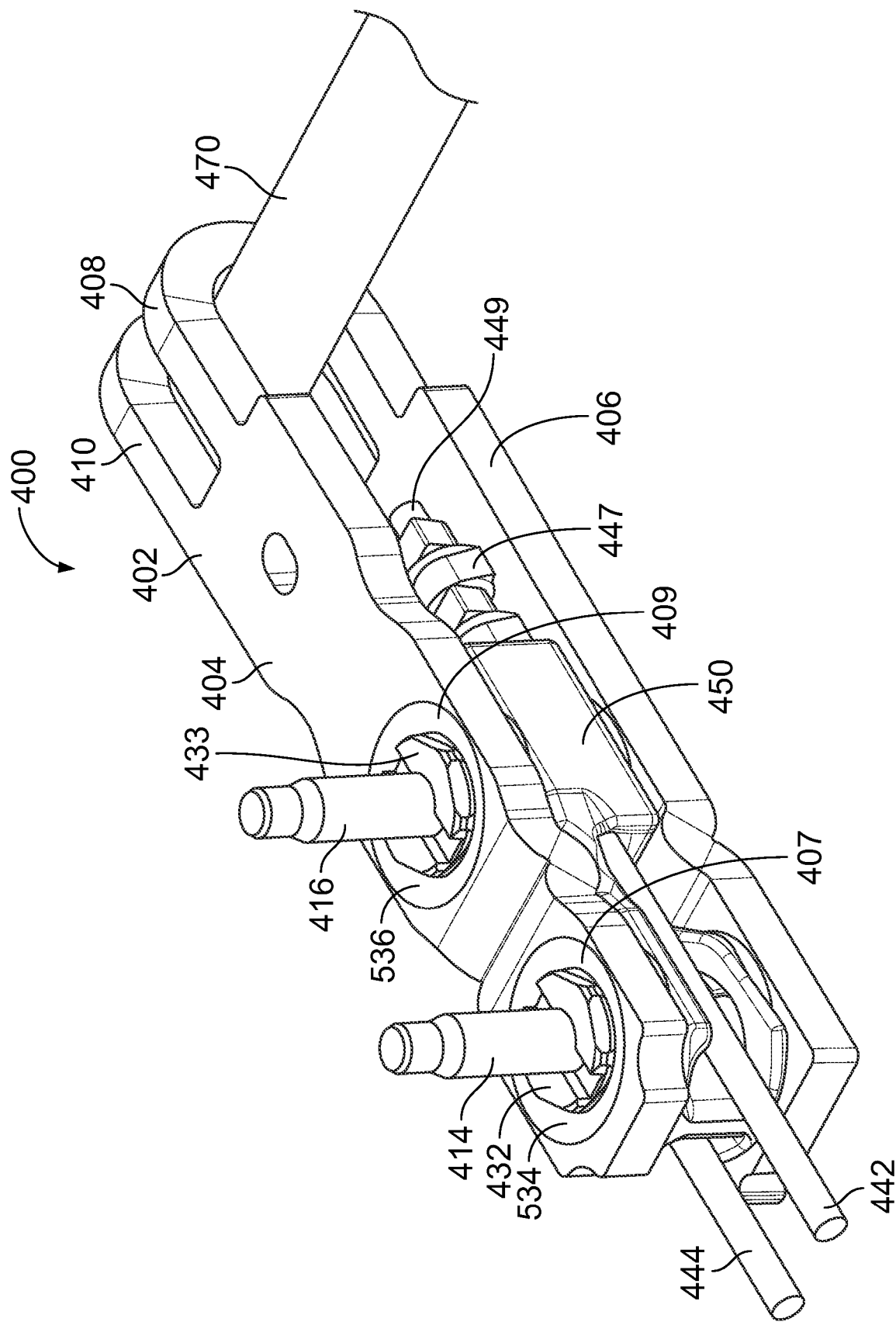
FIGS. 10A and 10B are top and bottom perspective views of a conveyor belt fastener showing steel cables of a conveyor belt extending into a space between the upper and lower plate portions of the fastener.
Figure 10B:
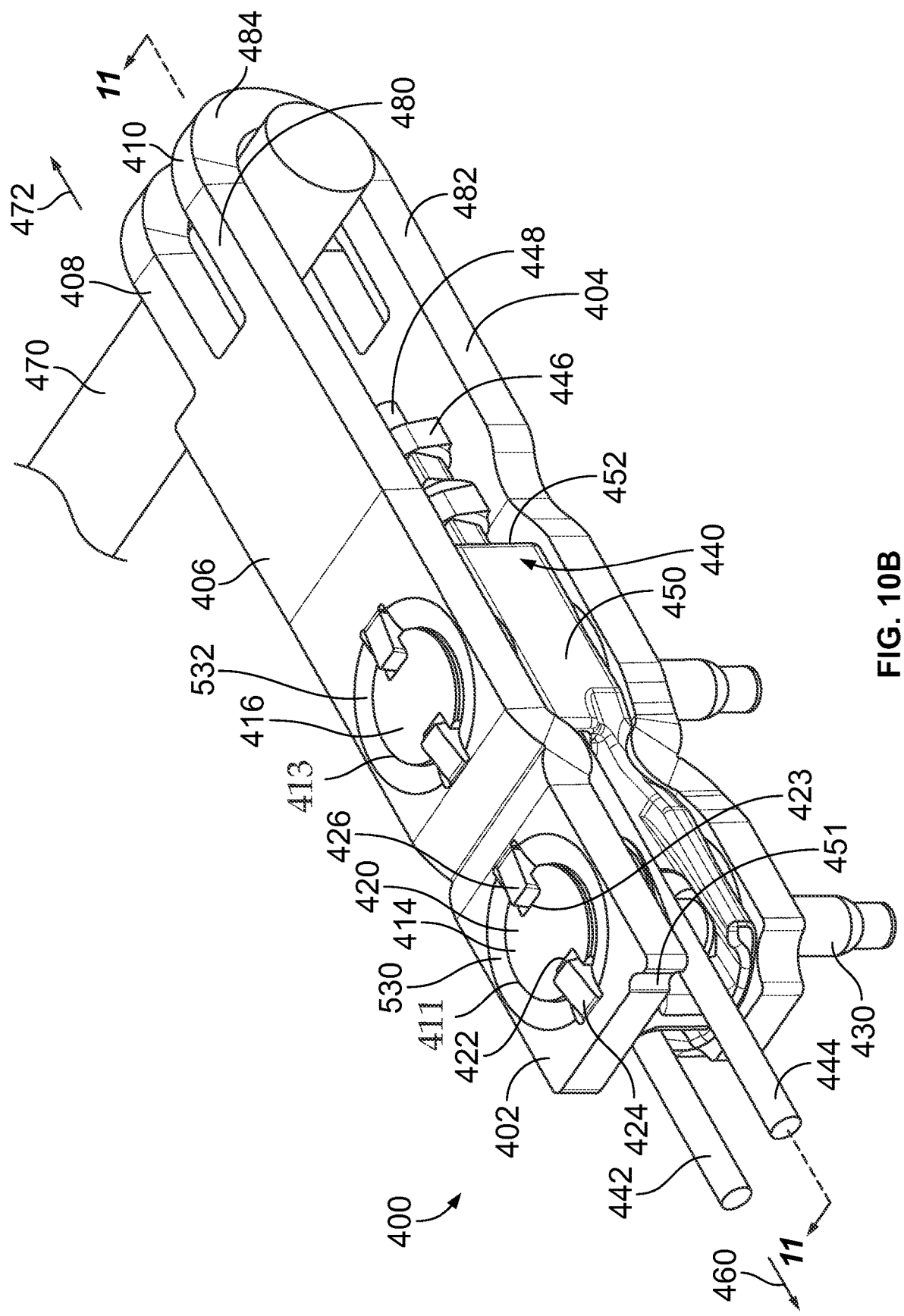

With reference to FIGS. 10A and 10B, a fastener 400 is provided that is similar in many respects to the fastener 10 discussed above. The fastener 400 includes a body 402 having an upper plate portion 404, lower plate portion 406, and loop portions 408, 410 connecting the upper and lower plate portions 404, 406. Like the loop proportions 50, 52 discussed above, each of the loop portions 408, 410 includes proximal portions 480, 482 (see FIG. 10B) and a laterally enlarged, arcuate distal portion 484. The laterally enlarged, arcuate distal portions 484 provide a wide contact area between the loop portions 408, 410 and the hinge pin 470. The laterally enlarged, arcuate distal portions 484 of the loop portions 408, 410 thereby reduce peak stress in the loop portions 408, 410 and provide enhanced durability for the fastener 400.

The upper plate portion 404 includes apertures such as through openings 407, 409 and the lower plate portion 406 includes apertures such as openings 411, 413 vertically aligned with the openings 407, 409. The openings 407, 409 and 401, 413 are sized to receive bolts 414, 416. The bolts 414, 416 each include a head portion 420 having notches 422, 423 to engage tabs 424, 426 of the lower plate portion 406 to inhibit turning of the bolts 414, 416. The bolts 414, 416 each include a shank portion 430 configured to be threadingly engaged with a nut 432, 433 (see FIG. 11).

Regarding FIGS. 10A and 10B, the fastener 400 includes a stop 440 and ferrules such as crimps 446, 447 that are secured to end portions 448, 449 of the cables 442, 444. In one embodiment, the stop 440 includes a stop body such as a ferrule support 450. The ferrule support 450 has a stop surface 452 that is engaged by the crimps 446, 447 when the cables 442, 444 are subject to tension forces in direction 460 during conveyor belt operation.

The loop portions 408, 410 are configured to extend about a hinge pin 470. The hinge pin 470 applies a load generally in direction 472 against loop portions 408, 410 due to, for example, tension in the conveyor belt. The loop portions 408, 410 are able to pivot around the circumference of hinge pin 470, such as when the splice including the fastener 400 travels over a pulley. The fastener body 402 may include one or more features 451, such as notches, to identify one or more characteristics of the fastener 400 to an installer, such as the size of the fastener 400. For example, the smallest fastener in a product line may have one notch, a medium fastener may have two notches, and the largest fastener may have three notches.

Figure 11:
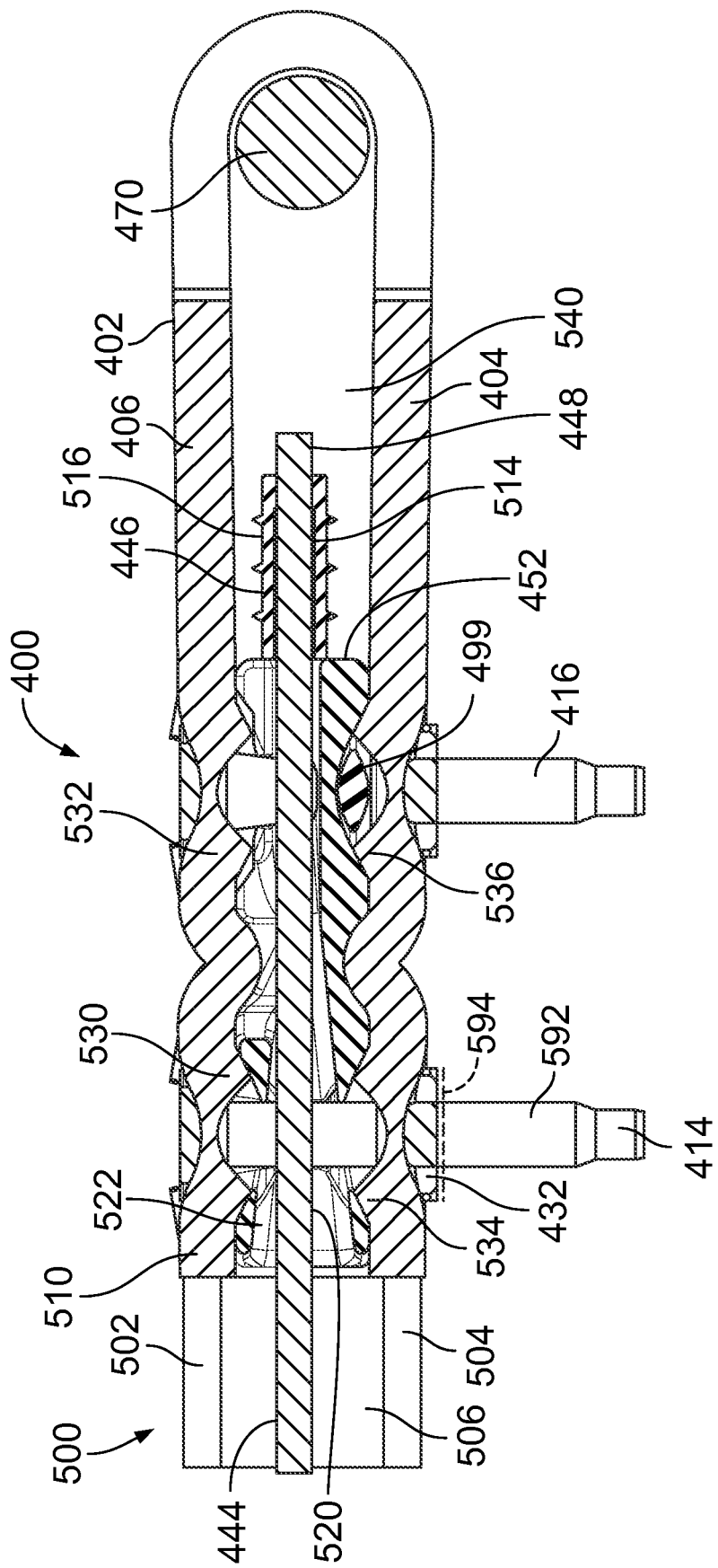
FIG. 11 is a cross-sectional view taken across line 11-11 in FIG. 10B showing a crimp of the fastener secured to an end portion of one of the cables, the crimp abutting a ferrule support of the fastener.

With reference to FIG. 11, the fastener 400 is shown connected to a conveyor belt 500 having an upper cover 502, a lower cover 504, and a core 506 during installation of the fastener 400 and before quick-cure polyurethane being poured onto the fastener 400. The core 506 may include, for example, steel cables embedded in a polymer such as rubber.

In other embodiments the core 506 may include alternating layers of a polymer and a fabric.

The cable 444 extends in an outboard direction from the core 506, past an inboard end 510 of the fastener body 402, through a through opening 522 of the ferrule support 450, and into a through opening 514 of the crimp 446. The crimp 446 has a sidewall or annular wall 516 extending about the through opening 514 and the cable end portion 448 received therein. The cable 444 has an intermediate portion 520 extending in the longitudinal through opening 522 of the ferrule support 450. The intermediate portion 520 of the cable 444 extends on one side of the bolts 414, 416 while the cable 442 also has an intermediate portion that extends through another longitudinal through opening 526 (see FIG. 12) on an opposite side of the bolts 414, 416.

Figure 12:
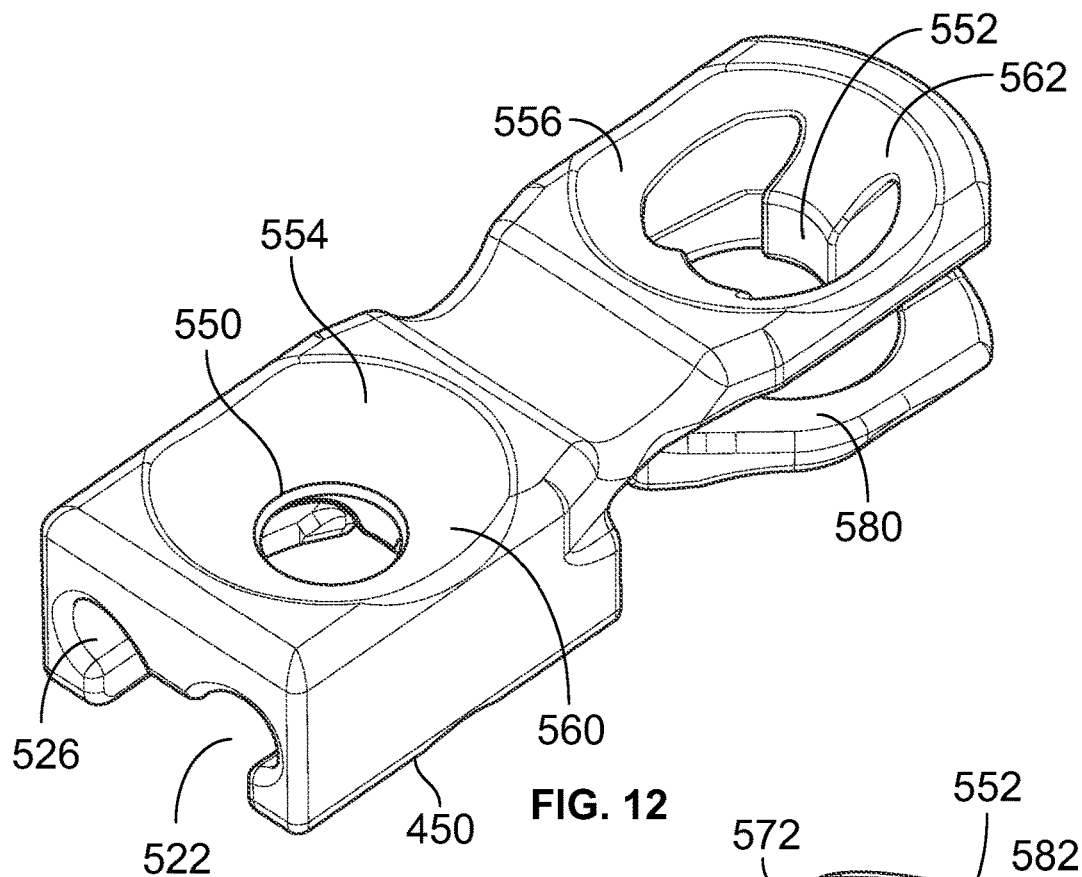
FIG. 12 is a top perspective view of the ferrule support of the fastener of FIG. 10A showing two vertical through openings in the ferrule support for receiving bolts of the fastener.

With reference to FIGS. 11 and 12, the lower plate portion 406 has recessed countersinks 530, 532 and the upper plate portion 404 has recessed countersinks 534, 536. The countersinks 530, 532 and 534, 536 protrude into a gap or space 540 between the upper and lower plate portions 404, 406 that receives the ferrule support 450.

Regarding FIG. 12, the ferrule support 450 has vertical through openings 550, 552 that receive the bolts 414, 416 and recesses 554, 556 for receiving the countersinks 534, 536 of the upper plate portion 404. The vertical through opening 550 is centered between the longitudinal through openings 522 and 526 so that the intermediate cable portions 520 extending therethrough are offset on either side of the bolt 416 extending through the vertical through opening 550. The ferrule support 450 has an upper beveled surface 560 (see FIG. 12) for engaging a lower projecting surface of the countersink 536 and an upper beveled surface 562 for engaging an underside of the countersink 534.

Regarding FIG. 12, the ferrule support 450 has lower beveled surfaces 570, 572 extending about recesses 574, 576 that receive the countersinks 532, 530 of the lower plate portion 406. The lower beveled surfaces 570, 572 engage upper surfaces of the countersinks 532, 530.

The ferrule support 450 is secured between the upper and lower plate portions 404, 406 via the engagement of the countersinks 530, 532, 534, 536 of the body 402 and the beveled surfaces 554, 556, 570, 572 of the ferrule support 450. Further, the engaged nuts 432 and bolts 414, 416 clamp the upper and lower plate portions 404, 406 onto the ferrule support 450 and fix the body 402 to the ferrule support 450.

Regarding FIG. 11, in one embodiment the fastener 400 includes washers 499 positioned between the countersinks 534, 536 and the ferrule support 450 along the bolts 414, 416. The washers 499 are made of a deformable material, such as a polymer such as rubber. The washers 499 are engaged with threads of the bolts 414, 416 and keep the bolts 414, 416 connected to the fastener body 402 as a user is handling and installing the fastener 400. The washers 499 and head portions of the bolts 414, 416 each have larger outer diameters than the through openings 407, 409, 411, 413 of the fastener body 402 that receive the bolts 414, 416. The washers 499 keep the bolts 414, 416 in the through openings 407, 409, 411, 413 after insertion of the bolts 414, 416, such as at the manufacturer of the fastener 400, and before installation of the fastener 400.

Figure 13:
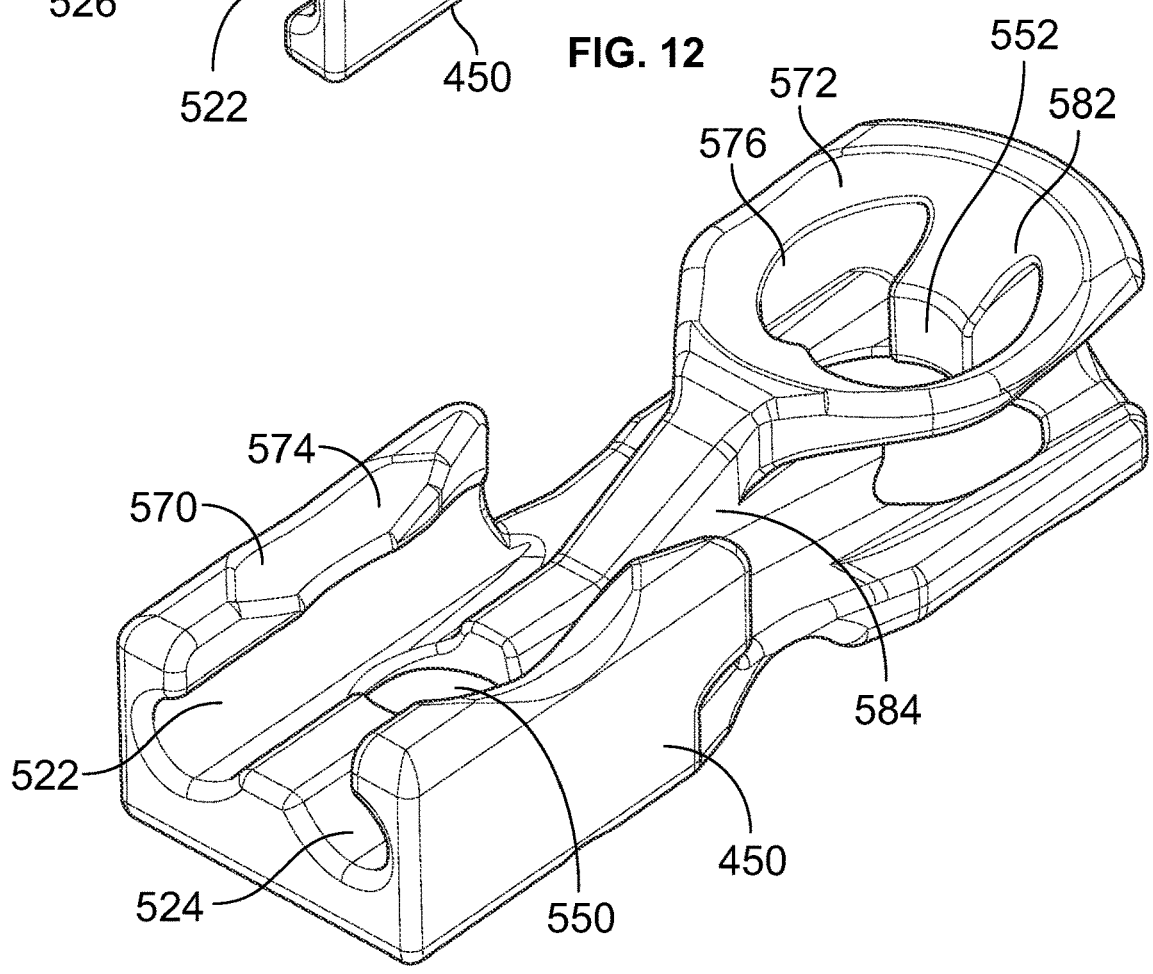
FIG. 13 is a bottom perspective view of the ferrule support of FIG. 12 showing two horizontal through openings of the ferrule support for receiving the cables of the conveyor belt.

With reference to FIGS. 12 and 13, the ferrule support 450 may include one or more strut portions 580 that facilitate the flow of material to a wall portion 582 of the ferrule support 450 during a molding operation. Specifically, the ferrule support 450 may be formed by pouring liquid metal into a mold and the portions of the mold that form the strut portions 580 permit liquid metal to flow throughout the mold.

With reference to FIG. 13, ferrule support 450 has a wall portion 584 that extends between the cables 442, 442 and provides rigidity to the material of the ferrule support 450 forming the through opening 552.

To install the fastener 400 on the cables 442, 444, the crimps 446, 447 each have an initial, cylindrical configuration that permits the crimps 446, 447 to be slid onto the end portions 448, 449 of the cables 442, 444. An installer uses a crimping tool to deform the sidewall 516 of the crimps 446, 447 about the cables 442, 444 and frictionally engage the crimps 446, 447 with wires of the cables 442, 444. The installer connects the ferrule support 450 to the cables 442, 444 before or after securing the crimps 446, 447 to the cables 442, 444.

The installer then positions the assembled cables 442, 444, crimps 446, 447 and ferrule support 450 between the upper and lower plate portions 404, 406 of the fastener body 402. Next, the installer assembles the bolts 414, 416 onto the fastener body 402 and tightens down the nuts 432, 433 to clamp the upper and lower plate portions 404, 406 onto the ferrule support 450 and tightly engage the countersinks of the upper and lower plate portions 404, 406 with the recesses of the ferrule support 450.

With reference to FIG. 11, once the fastener 400 has been secured to the cables 442, 444, the installer removes portions 592 of the shank portions 430 of the bolts 414, 416 that project beyond the nuts 432, 433. For example, the installer may snap off the excess portions 592 with a tool for this purpose to form an end of the bolts 414, 416 at dashed line 594.

Uses of singular terms such as "a," "an," are intended to cover both the singular and the plural, unless otherwise indicated herein or clearly contradicted by context. The terms "comprising," "having," "including," and "containing" are to be construed as open-ended terms. It is intended that the phrase "at least one of" as used herein be interpreted in the disjunctive sense. For example, the phrase "at least one of A and B" is intended to encompass A, B, or both A and B.

While there have been illustrated and described particular embodiments of the present invention, it will be appreciated that numerous changes and modifications will occur to those skilled in the art, and it is intended for the present invention to cover all those changes and modifications which fall within the scope of the appended claims.

What is claimed is:

1. A conveyor belt fastener for being secured to an end of a conveyor belt, the conveyor belt fastener comprising:
   a body;
   an upper plate portion of the body;
   a lower plate portion of the body;
   apertures of the upper and lower plate portions to receive an attachment member for securing the upper and lower plate portions to the end of the conveyor belt;
   loop portions of the body connecting the upper plate portion and the lower plate portion, the loop portions configured to extend about a laterally extending hinge pin;
   a lateral spacing of the body between the loop portions, the lateral spacing configured to receive a loop portion of a fastener secured to another end of the conveyor belt;

proximal portions of each of the loop portions adjacent the upper and lower plate portions, the proximal portions each having a proximal lateral width; and a laterally enlarged distal portion of each of the loop portions extending arcuately intermediate the proximal portions along the loop portion for contacting the hinge pin, the laterally enlarged distal portion having a distal lateral width larger than the proximal lateral width to provide a wide contact area between the loop portion and the hinge pin, wherein each of the loop portions has a maximum lateral width at a midpoint of the loop portion, and the laterally enlarged distal portions each have laterally spaced side surface portions that taper toward one another as the side surface portions extend away from the midpoint along the loop portion.

2. The conveyor belt fastener of claim 1 wherein the laterally enlarged distal portions each include laterally spaced convex side surface portions at the midpoints of the loop portion.

3. The conveyor belt fastener of claim 2 wherein each of the laterally enlarged distal portions includes pairs of laterally spaced concave side surface portions on opposite sides of the convex side surface portions, each pair of concave side surface portions extending away from the convex side surface portions along the loop portion.

4. The conveyor belt fastener of claim 1 wherein the loop portions include inner surfaces for extending about the hinge pin, outer surfaces opposite the inner surfaces, and side surfaces connecting the inner and outer surfaces;

wherein the proximal portions of each of the loop portions includes parallel, flat side surface portions having the proximal lateral width extending therebetween; and wherein the laterally enlarged distal portion of each of the loop portions includes tapering side surface portions that taper laterally outward from the flat side surface portions of the proximal portions as the tapering side surface portions extend away from the flat side surface portions along the loop portion.

5. The conveyor belt fastener of claim 1 wherein the loop portions have inner surfaces for extending about the hinge pin and outer surfaces opposite the inner surfaces; and wherein the loop portions each have a thickness between the inner and outer surfaces that is uniform throughout the loop portion.

6. The conveyor belt fastener of claim 1 the loop portions have inner surfaces for extending about a hinge pin and outer surfaces opposite the inner surfaces; and wherein each of the loop portions has a cross-section perpendicular to the inner and outer surfaces of the loop portion that varies in cross-sectional area as the loop portion extends between the upper and lower plate portions.

7. The conveyor belt fastener of claim 6 wherein the laterally enlarged distal portion of each loop portion has a cross-sectional area that is larger than a cross-sectional area of proximal portions of the loop portion.

8. The conveyor belt fastener of claim 6 wherein the cross-section of each loop portion has a lateral, width dimension that varies throughout the loop portion and a thickness dimension perpendicular to the lateral dimension that is uniform throughout the loop portion.

9. The conveyor belt fastener of claim 1 in combination with the attachment member, wherein the attachment member comprises a rivet, a staple, or a bolt and nut.

10. The conveyor belt fastener of claim 1 wherein the body has a unitary, one-piece construction.

11. The conveyor belt fastener of claim 1 wherein the loop portions each have laterally spaced side surfaces without stress risers.

12. The conveyor belt fastener of claim 1 further comprising:

a ferrule to connect to a conveyor belt cable;

a ferrule support configured to fit between the upper and lower plate portions of the body, the ferrule support having a stop surface for engaging the ferrule and an opening sized to permit the conveyor belt cable to extend therethrough; and wherein the upper and lower plate portions of the body and the ferrule support have mating portions configured to engage and inhibit pull-through of the ferrule support from between the upper and lower plate portions.

13. The conveyor belt fastener of claim 12 in combination with the attachment member, the attachment member comprising a bolt and a nut;

wherein the ferrule support has an opening aligned with the apertures of the upper and lower plate portions with the ferrule support between the upper and lower plate portions, the bolt configured to extend through the opening of the ferrule support and the apertures of the upper and lower plate portions.

14. A conveyor belt fastener comprising:

an upper plate portion;

a lower plate portion;

apertures of the upper and lower plate portions to receive an attachment member to attach the upper and lower plate portions to an end of a conveyor belt;

loop portions connecting the upper and lower plate portions;

a spacing between the loop portions configured to receive a loop portion of another conveyor belt fastener, the spacing varying in width between the loop portions as the loop portions extend between the upper and lower plate portions;

distal portions of the loop portions having a narrowest portion of the spacing therebetween; and proximal portions of the loop portions adjacent the upper and lower plate portions, the proximal portions having a wider portion of the spacing therebetween that is wider than the narrowest portion between the distal portions of the loop portions to provide clearance for a distal portion of the loop portion of the other conveyor belt fastener to be received between the proximal portions of the loop portions.

15. The conveyor belt fastener of claim 14 wherein the spacing extends laterally between the loop portions; and wherein the loop portions each have a lateral width that varies as the loop portions extend between the upper and lower plate portions.

16. The conveyor belt fastener of claim 14 wherein the spacing extends laterally between the loop portions;

wherein the proximal portions of each loop portion includes a minimum lateral width of the loop portion; and wherein the distal portion of each loop portion includes a maximum lateral width of the loop portion.

17. The conveyor belt fastener of claim 14 wherein the proximal portions of the loop portions include flat side surface portions having the wider portion of the spacing extending between the flat side surface portions.

18. The conveyor belt fastener of claim 17 wherein the distal portions of the loop portions include tapered surface portions extending obliquely to the flat side surface portions.

19. The conveyor belt fastener of claim 14 wherein the loop portions have inner surfaces for facing toward a hinge pin and outer surfaces opposite the inner surfaces; and wherein the loop portions have uniform thicknesses between the inner and outer surfaces as the loop portions extend between the upper and lower plate portions.

20. The conveyor belt fastener of claim 14 wherein the loop portions each have an inner surface, an outer surface, side surfaces, and junctures connecting the inner, outer, and side surfaces.

21. The conveyor belt fastener of claim 20 wherein the side surfaces include flat side surface portions and tapered side surface portions.

22. The conveyor belt fastener of claim 14 wherein the spacing between the loop portions is configured to permit the distal portion of the other conveyor belt fastener to be advanced downward or upward into the spacing between the proximal portions of the loop portions; and wherein the narrowest portion of the spacing between the distal portions of the loop portions is narrower than a maximum width of the distal portion of the other conveyor belt fastener to inhibit advancing of the distal portion of the other conveyor fastener through the narrowest portion of the spacing between the distal portions of the loop portions.

23. The conveyor belt fastener of claim 14 wherein the conveyor belt fastener includes a unitary, one-piece body comprising the upper plate portion, lower plate portion, and loop portions.

24. A system comprising the conveyor belt fastener of claim 14 in combination with the other conveyor belt fastener; and wherein the distal portion of the loop portion of the other conveyor belt fastener has a maximum width that is larger than the narrowest portion of the spacing between the loop portions.

25. A method of manufacturing a body for a conveyor belt fastener, the method comprising:

forming an elongate, flat fastener body from a base material, the flat fastener body having a longitudinal length and including plate portions and a pair of flat, flared loop portions having a lateral spacing therebetween for receiving a loop portion of another conveyor belt fastener, the flat, flared loop portions each having proximal portions adjacent the plate portions and a laterally enlarged distal portion intermediate the proximal portions along the flat, flared loop portions, wherein the proximal portions each have a proximal lateral width and the laterally enlarged distal portions each have a distal lateral width larger than the proximal lateral width; and bending the flat, flared loop portions of the flat fastener body into an arcuate configuration to orient one of the plate portions above the other of the plate portions.

26. The method of claim 25 wherein forming the flat fastener body includes forming tapered side surface portions of the flat, flared loop portions that extend obliquely to the longitudinal length.

27. The method of claim 25 wherein forming the flat fastener body includes forming a pair of lateral side surfaces of each of the flat, flared loop portions; and wherein each lateral side surface includes concave surface portions and a convex surface portion intermediate the concave surface portions along the loop portion.

28. The method of claim 25 wherein the flat, flared loop portions each have a maximum width at the laterally enlarged distal portion thereof; and wherein forming the flat fastener body includes forming tapered side surface portions of each of the laterally enlarged distal portions that extend toward one another as the tapered side surface portions extend away from the maximum width of the flat, flared loop portion.

29. The method of claim 25 wherein forming the flat fastener body includes forming the flat, flared loop portions to have a thickness perpendicular to the longitudinal length and lateral width that is uniform throughout the flat, flared loop portions.

30. The method of claim 25 wherein forming the flat fastener body includes forming apertures in the plate portions for receiving an attachment member.

31. The method of claim 25 wherein the base material comprises a sheet of material or a strip of material.

* * * * *